United States Patent [19]

Dukes

[11] 4,296,568
[45] Oct. 27, 1981

[54] AGRICULTURAL CROP COVER

[76] Inventor: Jesse M. Dukes, P.O. Box 1184, Hemet, Calif. 92343

[21] Appl. No.: 91,472

[22] Filed: Nov. 5, 1979

[51] Int. Cl.³ ............................................ A01G 13/00
[52] U.S. Cl. .......................................... 47/20; 47/17; 47/28 R
[58] Field of Search .................. 47/20, 28, 29, 26, 17; 135/5 R; 52/63, 83

[56] References Cited

U.S. PATENT DOCUMENTS

| 711,225 | 10/1902 | Putnam et al. | 47/28 R |
| 1,106,624 | 8/1914 | Cadwallader et al. | 47/20 |
| 2,051,643 | 8/1936 | Morrison | 47/28 R |
| 3,481,073 | 12/1969 | Yoshida et l. | 47/17 |
| 3,653,150 | 4/1972 | Howard | 47/29 |
| 3,932,958 | 1/1976 | Kistler et al. | 47/28 R |
| 4,050,972 | 9/1977 | Cardinal | 47/28 R X |

FOREIGN PATENT DOCUMENTS

| 443840 | 10/1912 | France | 47/20 |
| 1464097 | 11/1966 | France | 47/28 R |

Primary Examiner—Robert E. Bagwill
Attorney, Agent, or Firm—William C. Conkle

[57] ABSTRACT

A retractable cover for protecting agricultural crops against radiation frost. The polyethelene film cover lies atop a static rigging comprised of rows of posts permanently anchored in the earth and wires joining the posts. An elongated sheet rake extending the length of one row is attached to one side of the cover and is adapted to move the cover between a covering position and a retracted position adjacent a location where the cover is connected to the posts. Winch driven cables are used to move the sheet rake.

10 Claims, 12 Drawing Figures

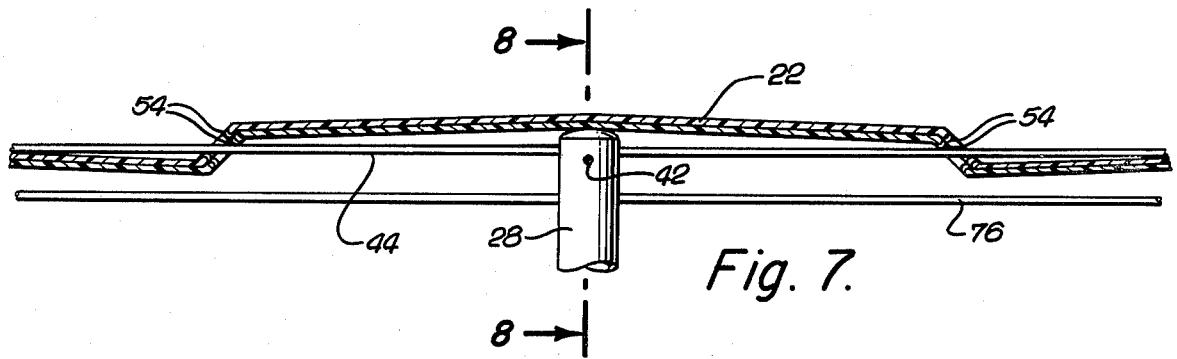
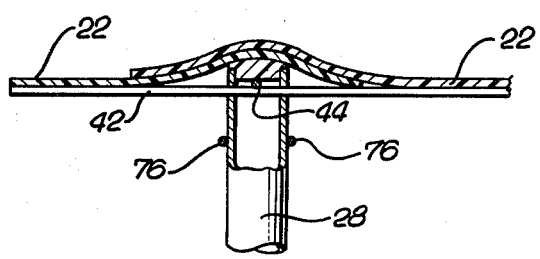
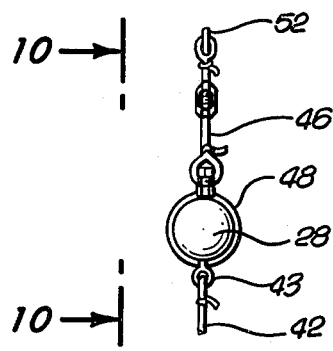
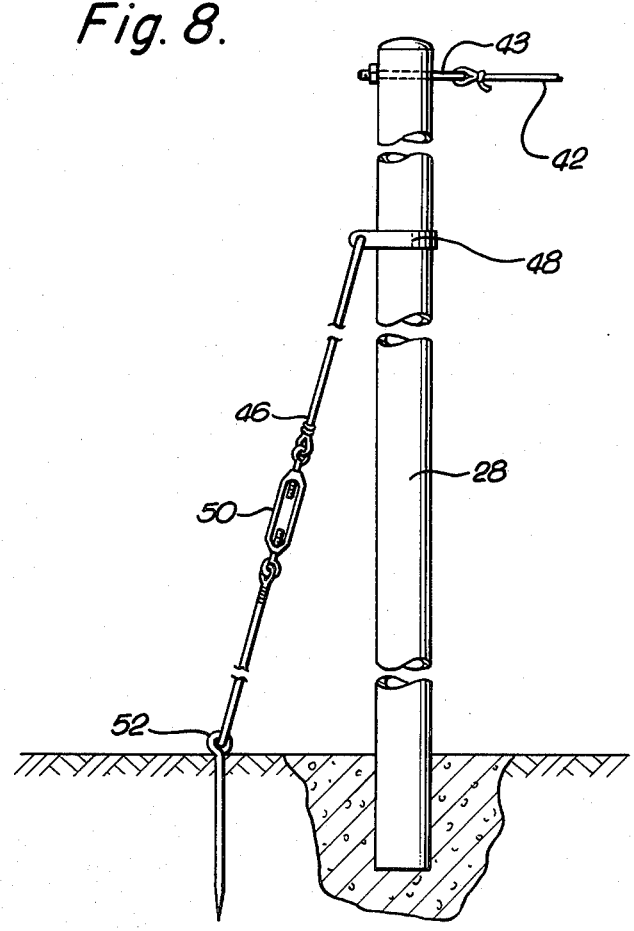

AGRICULTURAL CROP COVER

BACKGROUND OF THE INVENTION

The present invention relates to a movable cover or roof for covering crops such as orchard trees and protecting them from frost damage.

Frost can kill or injure crops and is an especially grave danger in orchards where the fruit itself is exposed during periods of cold weather. Methods of protecting crops against frost include smudge pots, university return stack heaters, liquid fuel heaters and wind machines all of which consume expensive fuel as well as portable covers which act to retain warm air or to block cold drafts. Portable covers may be used to cover individual plants or all the plants on a plot of land to retain warm air and to block cold air radiation.

Protective coverings for agricultural plots found in the prior art include movable protective covering for orchards disclosed in U.S. Pat. No. 1,106,624 to Cadwallader et al. In Cadwallader a framework of static rigging is formed by vertical uprights, carrying guy wires. A flexible fabric covering is extended over the framework by turning large drums located at opposite ends of the framework that operate as take-up reels for the fabric and for the cable which draws the fabric across the crossbars and rollers and along the support wires.

Movable fabric panels are found in U.S. Pat. No. 2,051,643 to Morrison which discloses a cloth house for protecting plants. In Morrison an insect-proof fabric house composed of numerous strips joined edge to edge is supported over a framework of posts, guy wires and supporting cables. Some fabric joints incorporate weight supporting wires and the lowermost edges of the fabric are held fast to a framework by wires within the fabric edge which connect to gourmets located on baseboards of the framework. Morrison's cloth house was improved by adding the transverse cords disclosed in U.S. Pat. No. 2,143,659 to Morrison to the top surface of the house.

Another form of portable plant protection is disclosed in U.S. Pat. No. 3,100,950 to Heuer in which a cover is suspended between or across rows of posts. The cover can be folded back by manually drawing it back in a direction along the row.

While the devices disclosed in the identified patents and other devices in the prior art were satisfactory for their intended use, they were not intended to be adapted for use with lightweight synthetic materials.

Thus there existed a need for a plant protecting cover which could selectably be placed over the crops to protect them or be withdrawn to allow light and water to enter the orchard. Ideally the cover should be easily operated by one man, should be able to be quickly opened or retracted, should be relatively inexpensive to fabricate and should be able to be exposed to the elements for a long period of time without damage. The present invention fulfills these requirements.

SUMMARY OF THE INVENTION

The present invention is embodied in a cover for protecting crops from frost damage. The cover is attached to a permanently installed framework and can be selectively extended to the covering position or withdrawn therefrom by means of a sheet rake which can move outwardly carrying an outer edge of the cover to an outer edge of the framework or inwardly scooping up and holding the cover as it moves inwardly. The sheet rake is propelled by running rigging comprising a plurality of winches that control sets of cables. Each set of cables contain at least one cable pulling the sheet rake and extending the cover over the framework and at least one other cable withdrawing the sheet rake and cover.

The framework comprises rows of posts joined by wires extending at right angles to the rows. The sheet rake moves atop the wires which support it. The winches and running rigging are attached to and support by the posts.

The cover of the invention is lightweight polyethylene film which is easily moved to and withdrawn from the covered position.

The present invention using a cover in two independently moved sections can cover an agricultural plot of about one acre. An operator winches one section into position, then the other section and can position both in about ten minutes. The invention protects from still air radiation frost without burning expensive fuels.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 7 is a fragmentary sectional view taken substantially in the direction of the line 7—7 in FIG. 1 and showing a transverse cable, the post and the cover;

FIG. 8 is fragmentary sectional view taken substantially along the line 8—8 in FIG. 7;

FIG. 9 is a fragmentary enlarged view of an area substatially enclosed by circular line 9 in FIG. 1 and showing a backstay, static rigging and one post;

FIG. 10 is a full left elevational view taken substantially in the direction of the line 10—10 in FIG. 9 and showing one post and backstay;

DESCRIPTION OF THE PREFERRED EMBODIMENT

Figure 1:
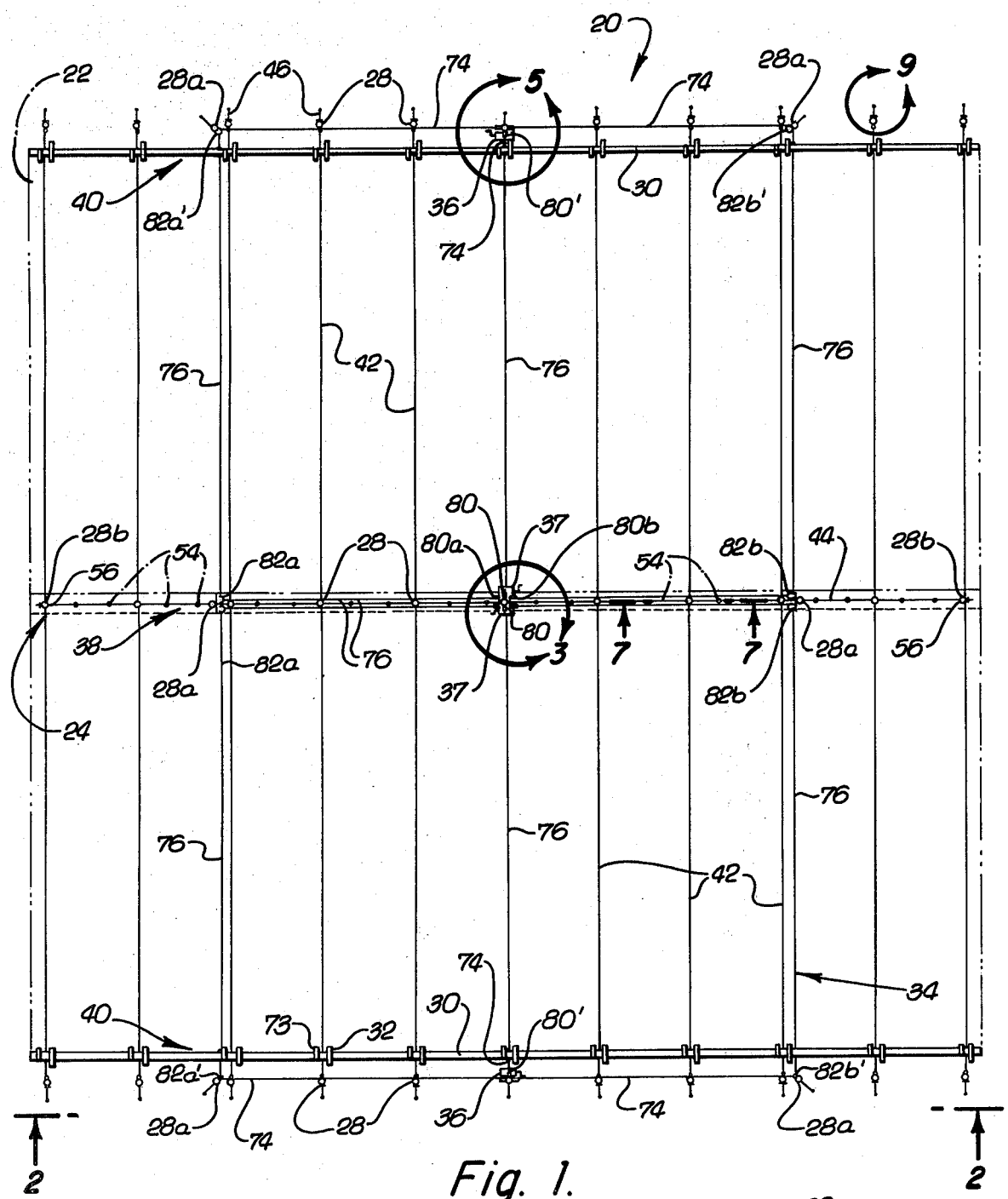
FIG. 1 is a plan view of a cover of the invention covering a plot of land having the cover shown only in broken line in order to reveal a framework below the cover.

The present invention resides in a framework 20 permanently installed in an agricultural plot and having a movable cover 22 which can be drawn over the framework to protect crops from damage resulting from still air radiation frost. The cover 22 is supported above the crops, which for the purpose of illustration will be described as fruit trees, by standing rigging 24 comprised of wires supported by upright posts 28. The posts 28 extend above the top of the fruit trees and thereby support both the standing rigging 24, attached to the post tops, and the cover 22 well over the protected fruit trees.

In accordance with the present invention, the flexible cover is supported over the fruit trees by standing rigging 24 while a movable sheet rake assembly 30 extending across and supported by the standing rigging 24 carries the free outer edges of the cover 22 outwardly from the center to the edges of the framework 20. As the sheet rake assembly 30 is drawn back towards the center of the framework 20, it gathers the cover 22 in a series of gathering tines 32 and carries the gathered cover back to the center of the framework. Running rigging 34 drawn by winches 36 and 37 enables one man to quickly and manually extend the cover 22 above the fruit trees or to withdraw the cover.

Figure 2:
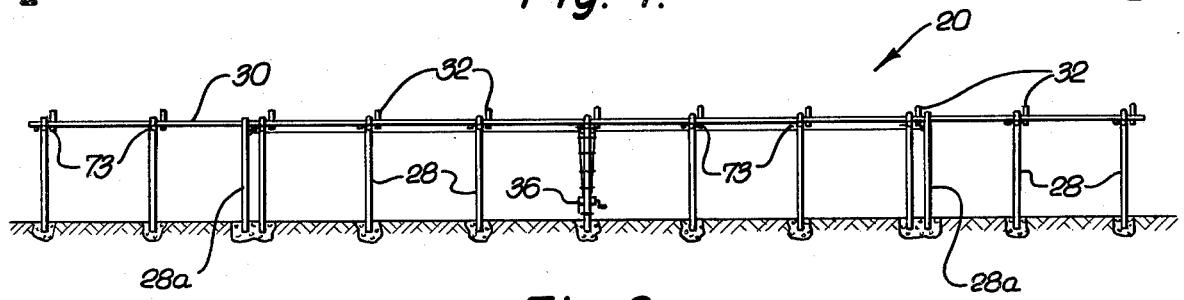
FIG. 2 is a front elevational view taken substantially in the direction of the arrows 2—2 in FIG. 1.
Figure 4:
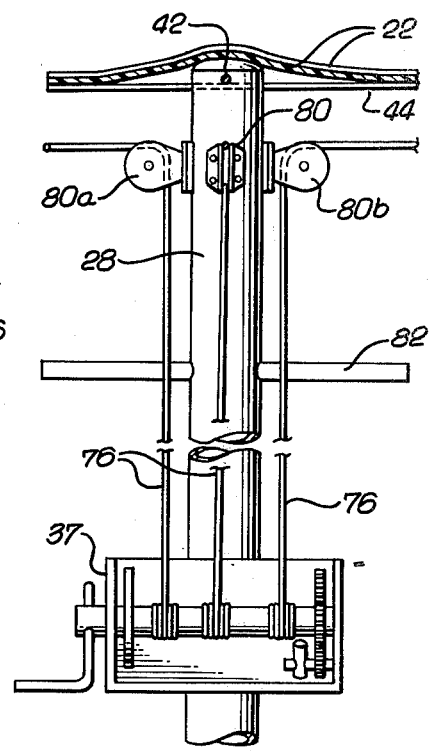
FIG. 4 is a rear elevational view taken substantially in the direction of the arrows 4—4 in FIG. 3 and showing the post, the winch and cables.
Figure 5:
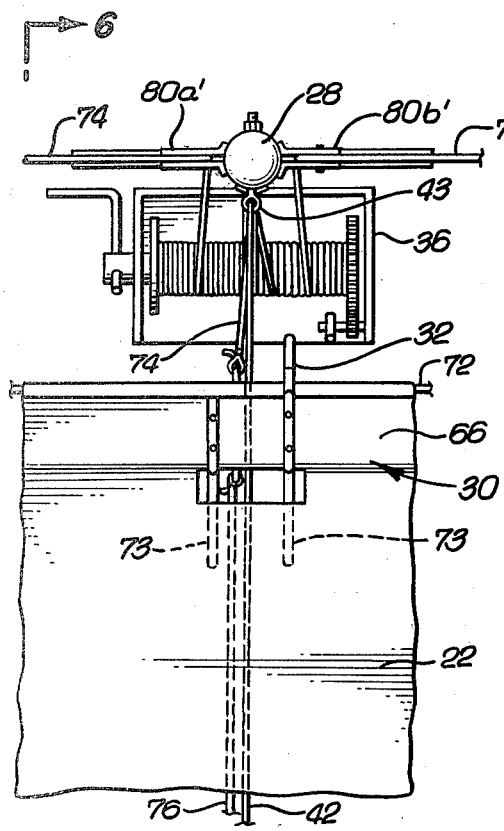
FIG. 5 is a fragmentary enlarged view of an area substantially enclosed by circular line 5 in FIG. 1 showing the winch and a portion of a sheet rake.
Figure 6:
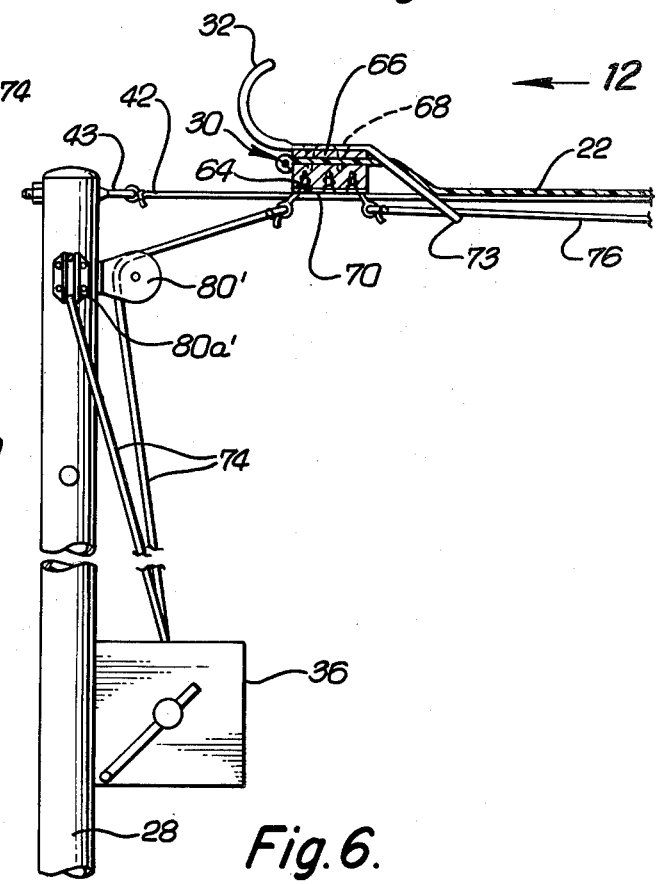
FIG. 6 is a left elevational view taken substantially in the direction of the arrows 6—6 in FIG. 5 and showing the post, winch and a sheet rake.
Figure 11:
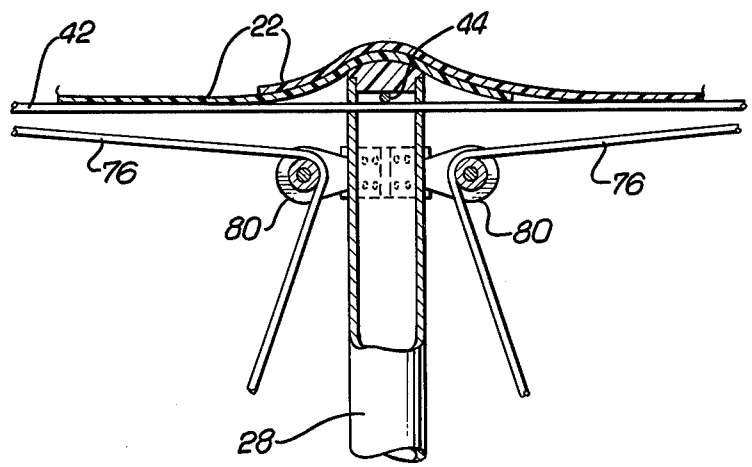
FIG. 11 is a sectional view substantially taken along the line 11—11 in FIG. 3.

More particularly, as can best be seen in FIGS. 1 and 2, the standing rigging 24 supporting the cover 22 comprises, in a typical installation, three rows of upright posts 28, a center row 38 and two edge rows 40. The posts 28 are permanently anchored in the earth, for example, in concrete filled holes, and the tops of the posts 28 extend sufficiently above the fruit trees so that no portion of the standing rigging is less than 18 inches above the fruit trees. As is shown in FIGS. 4 and 6 at least one step 82 is provided on each post 28 to enable a laborer to work atop the post.

Each post 28, herein 1½ inch galvanized steel, is connected to the corresponding post in the adjacent row by a laterally running support wire 42. Typical support wires 42 are ⅛ inch galvanized wire that are attached to the posts as can be seen in FIG. 10 by ¼ inch eye bolts 43. A transverse cable 44, made of 3/32 inch galvanized steel or other light cable, extends along the center row 38 passing through the top of each post 28 in the row.

The posts 28 are guyed into position by back stays 46. As can best be seen in FIG. 10, each back stay 46 includes the back stay itself made of wire, as well as an eye bolt clamp 48 connecting the stay to the post, a ¼ inch turnbuckle 50 and a 3 foot long ½ inch metal stake 52 that anchors the back stay into the ground. As can best be seen from FIG. 1, the back stays 46 extend perpendicularly outward of the framework 20 except for four back stays attached to posts 28a supporting the running rigging 34. These four posts extend outwardly in a direction opposite to the direction of force which the running rigging 34 applies to the post.

The cover 22 which can overlay the entire framework includes unitary sections of synthethic film stretching along the length of the sheet rake assembly 30 and extending between immediately adjacent rows of posts 28. The cover is made from films of polyethylene, polypropylene, nylon or other materials which form a tough plastic film having excellent fatigue and tear strength. The thickness of the cover is in the range between 4 and 6 mils. In the embodiments shown in FIG. 1, the cover sections are attached to one another at a location near the center of the framework 20 and along row 38. As is shown in FIG. 7, one method of connecting these sections to each other is accomplished by passing the transverse cable 44 through grommets 54 lying near the edges of the sections to be joined. In the illustrated embodiment, the cover 22 lies atop each post 28 in the center row 38 and the transverse cable 44 passes through the cover in the vicinity of each of those posts running from outside the cover to the inside thereof. Thereafter the transverse cable 44 passes through the top portion of the post 28 and thence outwardly of the cover 22 through another grommet 54. The transverse cable 44 is connected to the outermost posts 28b in the center row 38 by an eye bolt 56 and therefore the transverse cable passes only once through the cover in the vicinity of the outermost posts.

The movable portions of the invention comprise, as is shown in FIG. 1, the sheet rake assembly 30, the running rigging 34 and the outward pulling 36 and inward pulling winches 37 that move the running rigging. The sheet rake assembly 30 includes two elongated wooden members that extend across the entire framework 22, transversely to the support wires 42. The sheet rake assembly 30 holds the outer edge of the cover 22 sections between the wooden members. In the illustrated embodiment, and as is best shown in FIG. 6, the sheet rake assembly 30 has a rectangular cross section measuring 2 inches across and 1 inch high and that includes a frame 64 made of a 2"×¾" piece of wood to which a cap 66, made of a 2"×¼" piece of wood is joined by counter sunk screws 68. A bottom cover 70, a sheet of ⅛ inch aluminum protects the bottom and reduces friction between the sheet rake assembly 30 and the support wires 42. To increase the ability of the sheet rake assembly 30 to hold the cover, the outermost end of the cover is wrapped around, and is sewn to, a cord 72, typically 3/16 inch polypropylene. The cord 72 is placed on the outer side of the sheet rake assembly 30 defined in this specification and the appended claims as the side opposite the inside of the sheet rake which is the side facing the center of the framework 20, or facing the location at which the cover 22 is permanently attached to the framework.

Figure 12:
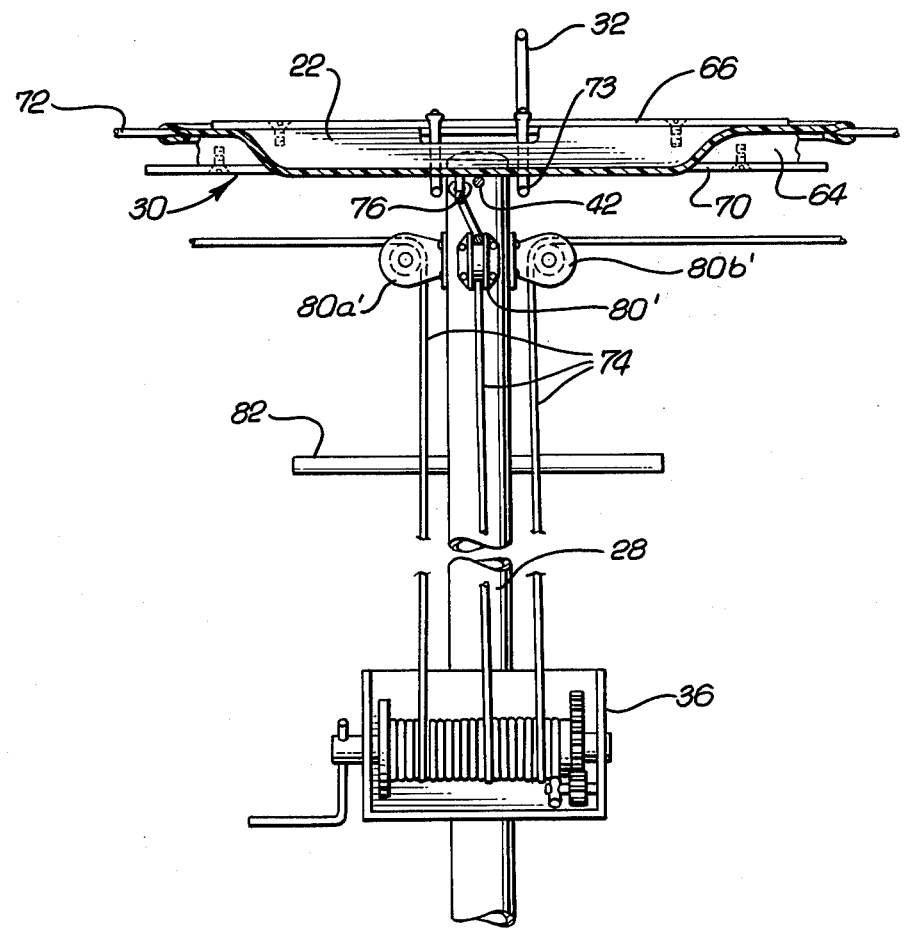
FIG. 12 is a fragmentary elevational view looking in the direction of the arrow 12 in FIG. 6 and showing the sheet rake.

As can best be seen in FIGS. 1 and 12, a pair of metal tines is attached to the sheet rake assembly 30 in the vicinity of each support wire 42. A scoop tine 73 extends generally inwardly and downwardly from the sheet rake assembly 30 in order to scoop the cover 22 up from the support wires 42 and on to the sheet rake assembly itself, thus preventing the cover from becoming trapped under the sheet rake assembly. The gathering tine 32, describing an arc commencing upwardly and rearwardly of the sheet rake assembly 30, holds the cover atop the assembly as the assembly moves toward the center of the framework 20 collecting the cover as it moves. Both tines are aluminum, have a rounded surface and are about 18 inches in length.

Figure 3:
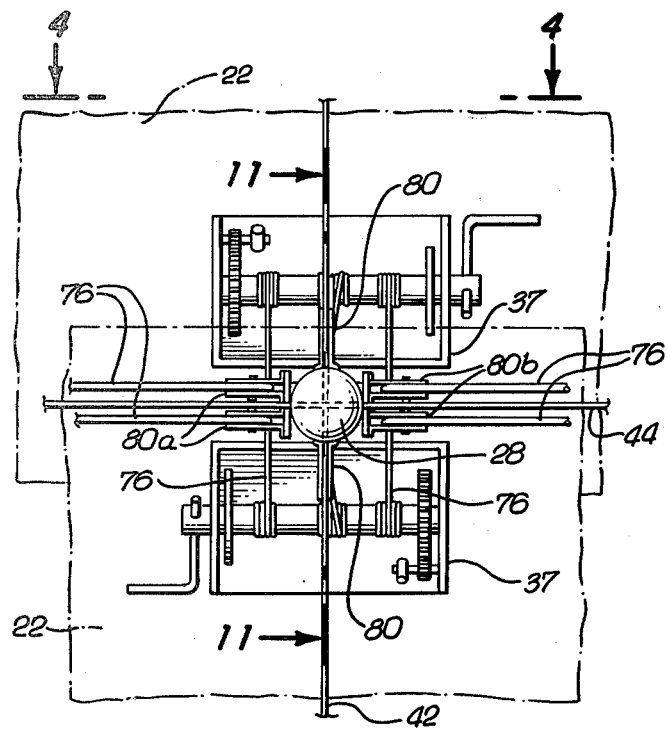
FIG. 3 is a fragmentary enlarged view of an area substantially enclosed by circular line 3 in FIG. 1 having the cover broken away to show a post and winches.

The running rigging 34, referred to above, moves the sheet rake assembly 30 outwardly and inwardly along the support wires 42. As shown in FIG. 1, the running rigging 34 includes four winches 36 and 37 each of which moves three cables 74 and 76. The outward pulling winches 36 take in those cables 74 that move the cover into the covering position by pulling the sheet rake assembly towards the edge rows 40, while the inwardly pulling winches 37 take in cables 76 that pull the cover back to the center. Each winch 36 and 37 the locations of which are described below carries three cables, one connected to the center of the sheet rake assembly and one on each side. The cables attached to the sides of the sheet rake assembly are placed at a suitable distance from the center of the framework 20, so that the pulling force of the cables is distributed uniformly along the length of the sheet rake assembly. The inward pulling center cable 76, as is shown in FIG. 3 and 4, is lead by a block 80, attached on the inward face of the center post 28, to its running position while the inwardly pulling cables connected to the sides of the sheet rake assembly 30 are led by blocks 80a and 80b on the side faces of the center post 28 and by blocks 82a and 82b on the outer running rigging posts 28a to their operating location. The corresponding outward pulling cable blocks have identical but primed numbers in the drawings, thus, one winch 36 or 37 draws three cables and thereby moves the sheet rake assembly 30.

In the embodiment depicted in FIG. 1, each outward pulling two winches 36 is attached to one of the posts 28 in the middle of edge rows 40, while both the inwardly pulling winches 37 are attached to one post 28 in the middle of the center row 38. Suitable winches for use in the invention are single spur gear, half ton winches such as those manufactured by Thern, Inc. of Winona, Wisconsin. The running cable herein is $\frac{1}{8}$ inch galvanized steel, 7×19, winch cable having a breaking strength of 2000 pounds.

From the foregoing, it will be appreciated that the protective cover 22 of the invention provides a device that protects agricultural crops from frost damage without the burning of costly fuels. The cover can be quickly moved into position by a single operator who can move the cover 22 over a one acre plot in about ten minutes. The cover 22 can be withdrawn to permit sunlight or rain to enter on the agricultural plot.

While a particular form of the invention has been illustrated and described, it will be apparent that various modifications can be made without departing from the spirit and scope of the invention.

I claim:

1. An apparatus for protecting crops against frost damage, said apparatus of the type having a framework supported by a plurality of erect posts planted permanently in the earth and a movable cover supported by and above said framework and above the crops, said cover being capable of being extended over the top of the framework to protect the crops from damage resulting from still air radiation frost, the improvement comprising:
    a static rigging attached to said posts;
    means for connecting said cover to said static rigging at a location along a center row of said posts; and
    means for transporting at least one outer edge of said cover between a first outer edge of said framework and any position between said center row location and said outer edge, said transporting means being supported by said static rigging; and being moved by running rigging, and
    means for scooping portions of said cover from said static rigging and gathering said cover on said transporting means as said transporting means moves from said first outer edge to said other positions.

2. The apparatus described in claim 1, wherein:
    said running rigging comprises at least two cables, or sets of cables, a first cable or set of cables moving said transportation means toward said first outer edge and a second cable or set of cables moving said transportation means away from said first outer edge, said running rigging being powered by at least one winch, each of said cables being led to said transportation means by at least one block.

3. The apparatus described in claim 1, wherein:
    said posts are positioned in at least two rows each row having a post spacing similar to the post spacing in the immediately adjacent row;
    said static rigging comprises wires connecting posts in one row to corresponding posts in the immediately adjacent row;
    said transporting means comprises an elongated sheet rake extending perpendicularly to and lying atop of said static rigging, said sheet rake having means for reducing friction between said rake and said static rigging as said rake moves along an upper surface of said static rigging, said sheet rake having an inner side facing said first outer edge of said framework and an outer side opposite therefrom.

4. The appratus described in claim 3 wherein said running rigging comprises a plurality of cables, each cable being connected to one winch and being led by at least one of said blocks to said sheet rake.

5. The apparatus described in claim 3 wherein:
    said scooping means comprises a plurality of tines extending from said inner side of said sheet rake, said tines extending downwardly and inwardly from said inner side of said sheet rake and having rounded upper surfaces for engaging said cover, and
    said gathering means comprising a plurality of arc shaped tines extending initially upwardly and outwardly from said the outer side of said sheet rake.

6. The apparatus described in claim 5 wherein:
    said means for reducing friction comprises a metallic bottom cover attached to a lower surface of said sheet rake;
    said sheet rake has a rectangular cross section and is formed from at least two wooden members.

7. The apparatus described in claim 1, wherein said cover is a unitary fabric section extending the length of said sheet rake in one dimension and extending between immediately adjacent rows of posts in the other dimension, said cover is made of polyethylene film, the thickness of said film being in the range between 4 and 6 mils.

8. The apparatus described in claim 1, wherein said cover is a unitary fabric section extending the length of said sheet rake in one dimension and extending between immediately adjacent rows of posts in the other dimension, said cover is made of polypropylene film, the thickness of said film being in the range between 4 and 6 mils.

9. The apparatus described in claim 1, wherein said cover is a unitary fabric section extending the length of said sheet rake in one dimension and extending between immediately adjacent rows of posts in the other dimension, said cover is made of nylon film, the thickness of said film being in the range between 4 and 6 mils.

10. An apparatus for protecting crops against frost damage, said apparatus of the type having a framework supported by a plurality of erect posts planted permanently in the earth and a cover mounted above said framework, the improvement comprising:
    said posts being positioned in at least two rows, each row having a spacing of posts similar to the post spacing in the row immediately adjacent to it;
    a static rigging comprising wires connecting posts in one row to corresponding posts in said immediately adjacent row;
    an elongated sheet rake extending perpendicularly to said static rigging, said sheet rake having, a bottom cover for reducing friction between said rake and said static rigging as a bottom portion of said rake moves along an upper surface of said static rigging, a plurality of scooping tines extending downwardly and inwardly from an inner side of said sheet rake, a plurality of arc-shaped gathering tines extending initially upwardly and outwardly from an outer side of said sheet rake;

said cover being fabricated from polyethylene film, into sections, each section extending the length of said sheet rake in one dimension and extending between immediately adjacent rows of posts in the other dimension, said film having a thickness in the range of 4 to 6 mils;

running rigging comprising a plurality of cables, each cable being fixedly attached at one end thereof to a winch and passing through at least one block that guides said cable to a point of connection with said sheet rake, said cables being pulled by said winch and being capable of transporting said sheet rake across said static means.

* * * * *